United States Patent
Blain

(10) Patent No.: US 6,220,277 B1
(45) Date of Patent: Apr. 24, 2001

(54) FLOW METERING SOLENOID VALVE

(76) Inventor: Roy W. Blain, Boellinger Hoefe, 74078 Heilbronn (DE)

( * ) Notice: Subject to any disclaimer, the term of this patent is extended or adjusted under 35 U.S.C. 154(b) by 0 days.

(21) Appl. No.: 08/946,477

(22) Filed: Oct. 7, 1997

(51) Int. Cl.[7] ................................................ F15B 13/044
(52) U.S. Cl. .............. 137/271; 251/129.02; 251/129.07; 251/129.18
(58) Field of Search ................... 251/129.07, 129.02, 251/129.18; 137/271

(56) References Cited

U.S. PATENT DOCUMENTS

| | | |
|---|---|---|
| 2,893,428 | 7/1959 | Collins . |
| 4,205,592 * | 6/1980 | Haussler . |
| 5,163,477 * | 11/1992 | Takano et al. ................... 251/129.02 |
| 5,218,999 * | 6/1993 | Tanimoto ........................ 251/129.15 |
| 5,535,783 * | 7/1996 | Asou et al. ..................... 251/129.07 |
| 5,593,004 * | 1/1997 | Blain . |
| 5,853,028 * | 12/1998 | Ness et al. ...................... 251/129.18 |
| 5,879,060 * | 3/1999 | Megerle et al. ................. 251/129.02 |

FOREIGN PATENT DOCUMENTS

| | | | |
|---|---|---|---|
| 465736 * | 6/1950 | (CA) | ................................ 251/129.02 |
| 1054298 * | 4/1959 | (DE) | ................................ 251/129.07 |
| 29 42 886 | 5/1981 | (DE) . | |
| 0 762 025 | 3/1997 | (EP) . | |

OTHER PUBLICATIONS

Letter dated Jan. 1, 1998 from Roy W. Blain to Eugene Chovanes, and attachment (total 7 pages).*

* cited by examiner

Primary Examiner—Kevin Shaver
Assistant Examiner—Thach H. Bui
(74) Attorney, Agent, or Firm—Eugene Chovanes

(57) ABSTRACT

A control for oil flow in a hydraulic system wherein a standard open closed type solenoid valve is modified so that the rate of flow through the valve relates to the electrical power supplied to the valve solenoid coil.

8 Claims, 2 Drawing Sheets

FLOW METERING SOLENOID VALVE

BACKGROUND OF THE INVENTION

1. Field of the Invention

This invention relates to a variable flow solenoid for the pilot control of an hydraulic valve.

2. Description of Related Art

In hydraulic control systems, it may be required to vary the flow of oil controlling the speed of a mechanical element, for example the speed of a hydraulic elevator. This can be done by employing known solenoid type proportional valves which respond to the signals given by a computer, this having received measurements of the actual speed of the elevator, comparing this speed with the value of a predetermined target speed and calculating the required adjustment of electrical power to the proportional valve solenoid effecting oil flow to achieve the required correction of elevator speed.

Proportional valves are more complex in their design than standard open-closed type solenoid valves and far more expensive. Both of these types are shown in the drawings (see description of FIG. 1 and FIG. 2 in Brief Description of the Drawings).

SUMMARY OF THE INVENTION

It is an object of the invention to employ the major parts of low cost standard open closed type solenoid valves with inexpensive modifications such that the rate of oil flow through the solenoid valve is relative to the electrical power supply to the solenoid coil, as with a proportional valve.

A further object of the invention is to reduce manufacturing and stocking costs of two essential types of flow metering valves by providing the options of having the flow path of the solenoid either "open" or "closed" in their position of rest when no electrical power is applied, employing identical parts in the solenoid assembly, with one minor exception.

A further object of the invention is to achieve interchangeability between a standard open-close two position type solenoid and a variable flow solenoid without the requirement of additional installation space or any other modification to the main hydraulic valve manifold.

DESCRIPTION OF THE PREFERRED EMBODIMENT

Figure 1:
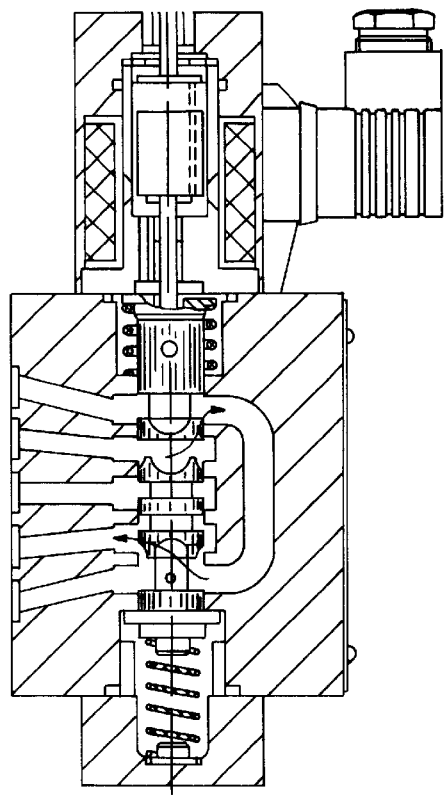
FIG. 1 shows a prior art standard type proportional valve, the relative complexity of which may be obvious.
Figure 2:
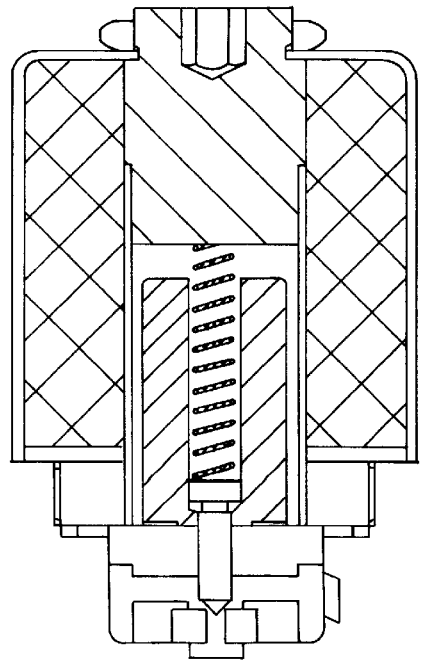
FIG. 2 shows a prior art standard open-close type solenoid valve unsuitable for variable flow control.

The coil housing 11 and electrical coil 12 are standard to the industry. The solenoid casing 13 consists of a non-magnet tube 14 welded together with a magnetisable soft steel anchor 15 at the upper end and a threaded flange 16 at the lower end. A soft steel core 17 fitting loosely within the tube assembly, carries a firmly attached flow metering needle 18 with an axial center bore 19 and a radial orifice 20 or 21 connecting a higher pressure source passage 30 with a lower pressure source passage 31. The radial orifice may be situated either at the upper end of the flow metering needle where it is "open" to flow in relation to the upper metering lip 23 as in (FIG. 3a) when the coil is de-energized or it may be at the lower end of the flow metering needle where it is "closed" to flow in relation to the lower metering lip 24 as in (FIG. 3b) when the coil is de-energized.

The flow metering needle fits closely but freely moveable in the needle guide 22 which is clamped into a recess in the main valve manifold 1 by the solenoid casing. Between metering lips 23 and 24 of the needle guide is a cavity 25 from which leads a radial bore 26 connecting the cavity to a lower pressure source through passage 31.

The direction of oil flow through the solenoid can be from passage 30 to passage 31 as described or in the reverse direction, depending to which passages the higher and lower pressure sources are attached.

In rest position, the core 17 is pressed downwards against the needle guide 22 by the metering spring 27 creating a gap between the core and the anchor.

A trimming screw (28) is threaded into anchor (15) and is adjustable to increase or reduce the compression of spring (27), and thus the force exerted by the spring (27) against needle (18). Screw (28) has a socket (29) to receive a suitable adjusting tool, which can rotate the screw to provide the adjustment.

Figure 3A:
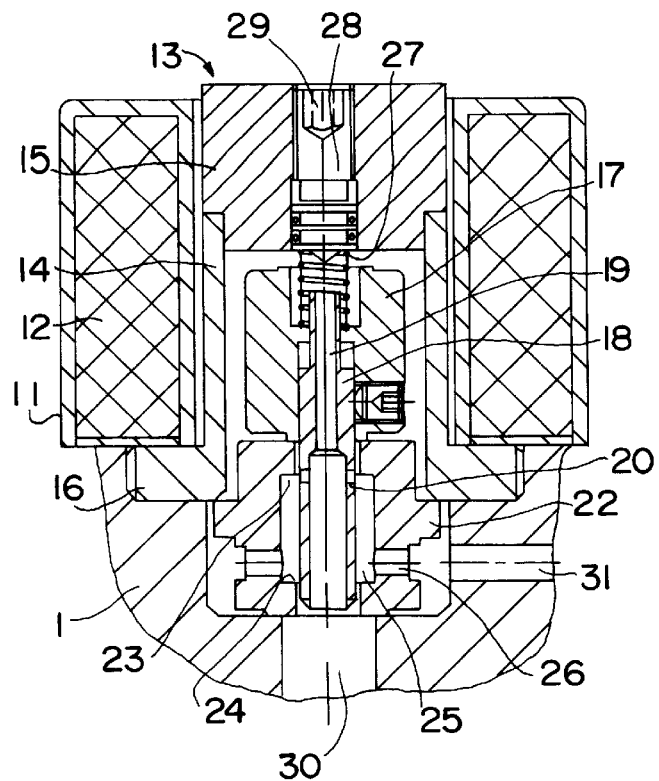
FIG. 3a illustrates the variable flow solenoid valve of the present invention, of the "open when de-energized" type.

FIG. 3a illustrates the solenoid arrangement with the needle radial orifice 20 below the "upper" metering lip 23 of the guide assembly and therefore "open" to flow through spring pressure when the coil is de-energized.

Increasing the electrical power applied to the coil moves the coil with needle towards the anchor against the force of the spring, proportionally "reducing" the size of the opening of the orifice 20 relative to the metering lip 23 thereby "decreasing" the rate of flow of pilot oil from a higher to a lower pressure source.

Figure 3B:
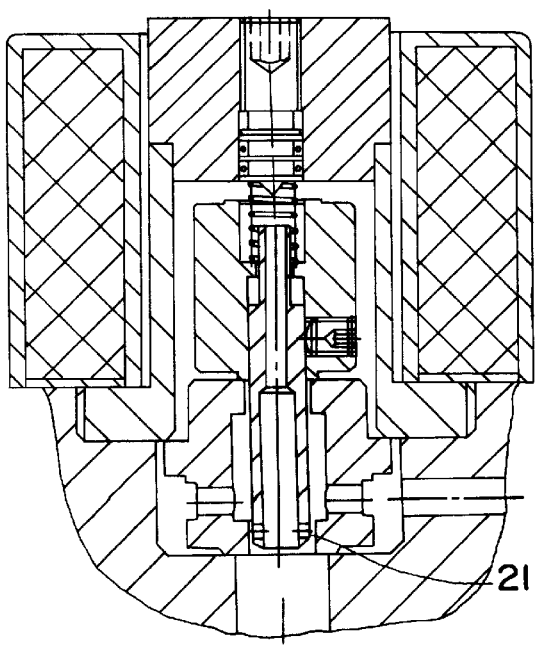
FIG. 3b illustrates the variable flow solenoid valve of the present invention, of the "closed when de-energized" type.

FIG. 3b illustrates the alternative solenoid arrangement with the needle radial orifice 21 below the "lower" metering lip 24 of the guide assembly and therefore "closed" to flow through spring pressure when the coil is de-energized.

Increasing the electrical power applied to the coil moves the core with needle towards the anchor against the resistance of the spring proportionally "increasing" the size of the opening of the orifice 21 relative to the metering lip 24 thereby "increasing" the rate of flow of pilot oil from the higher to the lower pressure source.

I claim:

1. An electrical solenoid valve for creating a variable restriction to control the rate of flow of pilot oil under pressure, comprising:
   - a.) a tube assembly having
     - a.1) a coil (12) within
     - a.2) a steel housing (11) surrounding
     - a.3) a non-magnetic tube (14) at which upper end
     - a.4) a magnetisable anchor (15) is firmly attached and at which lower end
     - a.5) a flange (16) is likewise firmly attached such that the tube assembly can be fixed into
   - b.) a valve manifold (1), clamping in place
   - c.) a needle guide (22) upon which rests
   - d.) a moveable core assembly having
     - d.1) a cylindrical magnetisable core (17), fixedly carrying below it
     - d.2) a flow metering needle (18), and having above it,
     - d.3) a metering spring (27) pressing the core (17) downward toward the needle guide (22), causing a gap between an upper face of the core (17) and a lower face of the anchor (15);

wherein, the moveable core assembly is in a hydraulically balanced state in that both ends of the needle (18) are subject to a pilot oil pressure of the same magnitude by means of an axial center bore (19) passing axially through the center of the needle (18), while the pilot oil being metered flows through an orifice (20) bored radially through the needle (18), into the axial center bore (19), exiting the orifice (20) through a variable restriction formed between the orifice (20) and an upper metering lip (23) on the internal diameter of the needle guide (22), through which guide (22), the needle (18) with orifice (20) can axially move to positions directly influenced by the electrical power applied to the coil (12) as the subsequent attracting magnetic force between the needle carrying core (17) and the anchor (15), balances the resistance of the metering spring (27), to provide a required rate of flow of pilot oil in a given direction from a higher to lower source of pilot oil pressure through the variable restriction.

2. A valve as defined in claim 1 wherein the radially bored needle orifice (20) is located just below the upper metering lip (23) of the needle guide, so that the valve is in an open position when the coil (12) is de-energized and closes proportionally to the increasing strength of the electrical power applied to the coil strength of the electrical power applied to the coil (12).

3. A valve defined in claim 1 wherein the radially bored needle orifice (20) is located just below a lower metering lip (24) of a flow control seat, so that the valve is in a closed position when the coil (12) is de-energized and opens proportionally to the increasing strength of the electrical power applied to the coil (12).

4. A valve as defined in claims 1, 2 or 3 wherein flow of pilot oil is in a reverse direction to the given direction, entering the orifice (20) over the upper metering lip (23) or the lower metering lip (24) and exiting through the center bore (19) of the needle (18).

5. A valve at defined in claim 1 wherein a trimming screw (28) is built into the anchor (15) to adjust the force of the metering spring (27) acting against the magnetizable core (17) to match an available electrical power range metering the rate of oil flow.

6. A valve as defined in claim 1, 2 or 3, wherein the position of the orifice (20) bored radially through the flow metering needle (18) can be at an upper or a lower end of the flow metering needle (18).

7. A valve as defined in claims 1, 2 or 3 wherein the valve is interchangeable with a standard two position open-closed type solenoid without any change to the main valve manifold without requiring additional space external to the manifold.

8. A valve as defined in claims 1, 2 or 3 wherein the direction of, flow of pilot oil can be in the reverse direction to the given direction, wherein the pilot oil enters the orifice over the lip of the flow metering lip and exits through the center bore of the needle, and wherein the valve is interchangeable with a standard two position open-closed type solenoid positioned in a main valve manifold without requiring additional space external to the manifold.

\* \* \* \* \*